United States Patent
Agarwal

(10) Patent No.: US 9,589,118 B2
(45) Date of Patent: Mar. 7, 2017

(54) CONTEXT-BASED AUTHENTICATION MODE SELECTION

(71) Applicant: Motorola Mobility LLC, Chicago, IL (US)

(72) Inventor: Nidhi Agarwal, Bangalore (IN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/463,720

(22) Filed: Aug. 20, 2014

(65) Prior Publication Data

US 2016/0055324 A1    Feb. 25, 2016

(51) Int. Cl.
*G06F 21/31* (2013.01)
*G06F 21/32* (2013.01)

(52) U.S. Cl.
CPC .............. *G06F 21/31* (2013.01); *G06F 21/32* (2013.01); *G06F 2221/2111* (2013.01); *H04L 2463/082* (2013.01)

(58) Field of Classification Search
CPC ..... G06F 21/32; G06F 21/31; H04L 2463/082
See application file for complete search history.

(56) References Cited

U.S. PATENT DOCUMENTS

| | | | |
|---|---|---|---|
| 8,255,698 B2 | 8/2012 | Li et al. | |
| 9,032,498 B1 * | 5/2015 | Ben Ayed | G06F 21/35 726/9 |
| 9,229,623 B1 * | 1/2016 | Penilla | G06F 3/04842 |
| 9,235,750 B1 * | 1/2016 | Sutton | G06K 9/00845 |
| 9,355,234 B1 * | 5/2016 | Magi Shaashua | G06F 21/32 |
| 2003/0097477 A1 * | 5/2003 | Vossler | H04L 12/4612 709/248 |
| 2005/0100113 A1 * | 5/2005 | Corts | H04L 7/04 375/295 |
| 2006/0218621 A1 * | 9/2006 | Covington | H04L 63/08 726/1 |
| 2007/0047522 A1 * | 3/2007 | Jefferson | H04L 12/581 370/352 |
| 2007/0120948 A1 * | 5/2007 | Fujioka | H04M 1/66 348/14.01 |

(Continued)

OTHER PUBLICATIONS

Mike Elgan; Gadgets Replacing Smartphone Passwords; Posted Aug. 7, 2013; Retrieved Sep. 22, 2015.*

(Continued)

*Primary Examiner* — James Turchen
(74) *Attorney, Agent, or Firm* — Morris & Kamlay LLP

(57) ABSTRACT

A system and method for configuring authentication of a mobile communications device entail detecting user context and device context factors and determining whether a current authentication mode is impractical or unfeasible in view of such factors. User context information of interest includes any indication that the user is driving or in a meeting for example. Context factors of interest include for example such factors as light, noise, or user activities such as driving. Based on this user context and device context, if the currently set authentication mode is impractical or unfeasible, then the device may select an available alternative authentication mode and reconfigure the device for that mode.

11 Claims, 6 Drawing Sheets

(56) References Cited

U.S. PATENT DOCUMENTS

| | | | | |
|---|---|---|---|---|
| 2009/0133106 A1* | 5/2009 | Bentley | ................ | G06F 21/31 |
| | | | | 726/5 |
| 2011/0261386 A1* | 10/2011 | Kasuya | ................ | G06F 21/608 |
| | | | | 358/1.14 |
| 2012/0252420 A1* | 10/2012 | Czaja | ................ | H04W 48/04 |
| | | | | 455/414.1 |
| 2013/0005414 A1* | 1/2013 | Bindra | ................ | B60R 25/25 |
| | | | | 455/575.9 |
| 2013/0150117 A1* | 6/2013 | Rodriguez | ................ | G06T 7/00 |
| | | | | 455/550.1 |
| 2013/0167212 A1* | 6/2013 | Azar | ................ | G06F 21/32 |
| | | | | 726/7 |
| 2013/0219454 A1 | 8/2013 | Hewinson | | |
| 2013/0267204 A1 | 10/2013 | Schultz et al. | | |
| 2014/0194150 A1* | 7/2014 | Wang | ................ | H04W 60/02 |
| | | | | 455/458 |
| 2014/0213234 A1* | 7/2014 | Inselberg | ................ | H04W 4/021 |
| | | | | 455/418 |
| 2014/0248907 A1* | 9/2014 | Peroulas | ................ | G01S 11/10 |
| | | | | 455/456.1 |
| 2014/0373117 A1* | 12/2014 | Le Saint | ................ | G06F 21/33 |
| | | | | 726/6 |
| 2015/0015688 A1* | 1/2015 | Yang | ................ | G06F 21/32 |
| | | | | 348/77 |
| 2015/0142261 A1* | 5/2015 | Wright, Jr. | ................ | B60K 35/00 |
| | | | | 701/36 |

OTHER PUBLICATIONS

Samuli Hemminki et al.; Accelerometer-Based Transportation Mode Detection on Smartphones; SenSys 2013; ACM; Nov. 11-15, 2013.*

ZTE Unveils Next-Generation Car Mode Application and Voice Biometrics at CES 2014; 2014 International CES; Jan. 8, 2014.*

How to set up Face Unlock on your Android phone by Gary Mazo; Jul. 24, 2012; retrieved from http://www.androidcentral.com/how-to-set-face-unlock-your-htc-one-x-or-evo-4g-lte on Mar. 24, 2016.*

* cited by examiner

CONTEXT-BASED AUTHENTICATION MODE SELECTION

TECHNICAL FIELD

The present disclosure is related generally to mobile device security, and, more particularly, to a system and method for providing a context-based authentication method selection and switching for a mobile device.

BACKGROUND

As mobile communication devices such as mobile phones, smart phones, and tablets become more capable, they are more frequently being used as a substitute for more traditional platforms. Thus, for example, a mobile device may now be used for banking, business communications, and other functions that were previously accomplished via a traditional desktop computer. While this new freedom has many benefits for users, it also creates new risks.

For example, due to their portable nature, mobile devices are less secure; that is, they are more easily compromised by thieves or other unauthorized parties. To combat this, many users configure their mobile devices to require authentication prior to granting access. Re-authentication may be required after a certain period of inactivity or after the user puts the device into an inactive state.

A number of authentication mechanisms are available, e.g., voice recognition authentication, password authentication, pattern authentication, facial recognition authentication, and so on. However, for most authentication mechanisms, there will be situations in which the selected mechanism is impractical. For example, in a dark theater, facial recognition authentication may be impractical, and in a loud train station, voice recognition authentication may be impractical.

While the present disclosure is directed to a system that may eliminate some of the shortcomings noted in this Background section, it should be appreciated that any such benefit is not necessarily a limitation on the scope of the disclosed principles or of the attached claims, except to the extent expressly noted in the claims. Additionally, the discussion of technology in this Background section is reflective of inventor observations or considerations, and is not intended to be admitted or assumed prior art as to the discussed details. Moreover, the identification of the desirability of a certain course of action is the inventors' observation, and should not be assumed to be an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in approaching the later discussion. As noted above, a user may configure a device, or a device may configure itself or be preconfigured, to use an authentication mode that is at times impractical or unfeasible due to device environmental factors ("device context") such as light, noise, or user activities such as driving, meeting. However, in various embodiments, a device configured in accordance with examples of the disclosed principles is able to determine based on device and user context that the currently set authentication mode is impractical or unfeasible and is further able to then determine and set an available alternative authentication mode. Herein, when an authentication mode is impractical or unfeasible in view of device context factors or a user activity, it is sometimes said to be "incompatible" with the device or user context. It will be appreciated that the device may reevaluate or reacquire device context information or user context information while evaluating alternative modes.

Turning now to a more detailed discussion in conjunction with the attached figures, techniques of the present disclosure are illustrated as being implemented in a suitable computing environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that many other device types such as but not limited to laptop computers, tablet computers, personal computers, embedded automobile computing systems and so on may also be used.

Figure 1:
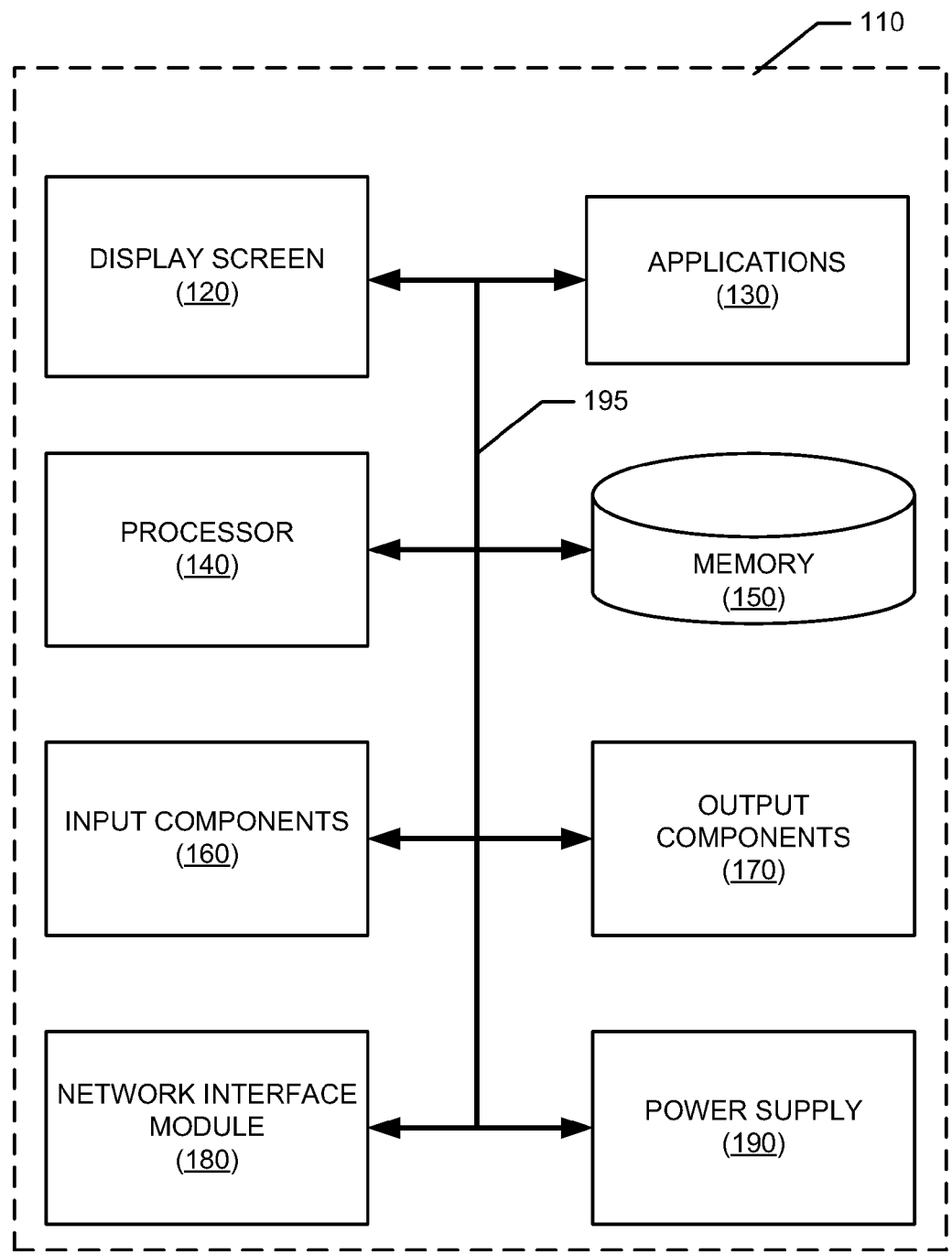
FIG. 1 is a generalized schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, applications 130, a processor 140, a memory 150, one or more input components 160 such as speech and text input facilities, and one or more output components 170 such as text and audible output facilities, e.g., one or more speakers.

The one or more input components 160 of the device 100 also include at least one sensor or system that measures or monitors device context factors associated with a current location of the device 100. The device context factors may include, for example, ambient light level, ambient noise level, voice detection or differentiation, movement detection and differentiation, and so on. Similarly, the device 100 may also include a sensor configured for determining location of the device such as a GPS module and associated circuitry and software. The network interface 180, discussed in more detail below, may also be used to discern environmental cues, e.g., with respect to nearby networks.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

The illustrated device 110 also includes a network interface module 180 to provide wireless communications to and from the device 110. The network interface module 180 may include multiple communications interfaces, e.g., interfaces for cellular, WiFi, broadband and other communications. A power supply 190, such as a battery, is included for providing power to the device 110 and its components. In an embodiment, all or some of the internal components communicate with one another by way of one or more shared or dedicated internal communication links 195, such as an internal bus.

Further with respect to the applications, these typically utilize the operating system to provide more specific functionality, such as file system service and handling of protected and unprotected data stored in the memory 150. Although many applications may govern standard or required functionality of the user device 110, in many cases applications govern optional or specialized functionality, which can be provided, in some cases, by third party vendors unrelated to the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that is uploaded to, downloaded from, or otherwise accessed at servers or other devices with which the device is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various icons that are linked to executable applications).

As noted above in overview, a mobile communication device operating in accordance with an embodiment of the disclosed principles determines a suitable authentication mechanism for the device based on the device context factors and user context, e.g., whether the user is driving, in a meeting, etc. More generally, user context may include user activities, user calendared events, and other indicia of what the user is or may be doing at a given time. If a user-selected authentication mode is incompatible with either the current device context or user context, the device may determine an alternative authentication mode that is compatible with both the device context and the user context.

Although there are a number of possible authentication modes, certain exemplary modes will be discussed as examples. In a first scenario, consider a device that is configured to require a voice command for authentication. Assume however that the device user and the device are currently in a mall or cinema that is unusually noisy. In such a situation, using a voice command for authentication is not feasible; the authentication may fail due to the ambient noise level. If a lower match requirement is used to prevent this, the risk of impersonation by an unauthorized user is correspondingly increased.

In another example, assume that a user device is configured to require an x-character password or multi-point drawn pattern for authentication; if the device user is currently driving a vehicle, then typing a multi-digit password or drawing a multi-point pattern on the device screen is not practical or advisable.

Continuing, consider a device that is configured to require facial recognition for authentication. If the device user is in bed, theater or any other dark environment with low ambient light and a preference against the use of a flash, then the surrounding light may not be sufficient to allow the device to capture an image sufficient to perform a facial recognition match and hence the device authentication will likely fail. With the same device, if the user is instead driving a vehicle, it will be impractical and inadvisable for the user to focus on the device camera for image acquisition, again rendering facial recognition for authentication unfeasible.

However, in embodiments of the disclosed principles, a device having a particular authentication mode set by the user or otherwise previously configured or set is able to reconfigure itself to use a different authentication mode that is compatible with both the ambient device conditions and the user context.

Thus, various aspects of a device's context may be taken into account in determining appropriateness of an authentication mode. While this disclosure will not attempt to exhaustively catalog every possible device context factor, certain aspects will be identified for the sake of example. Thus, for example, as noted above, ambient light level, ambient noise level, and user context (e.g., whether the user is driving) are all relevant device context factors in an embodiment. In particular, the factor of ambient light bears on the suitability of visual recognition techniques (facial recognition for example), while the factor of ambient noise level bears on the suitability of audible recognition techniques (voice recognition or spoken command authentication for example). The factor of user context bears on the suitability of user tasks such as manipulation tasks (keypad entry and pattern tracing or drawing), image capture, or audible tasks (spoken command). As noted above, manipulation tasks are less desirable when the user is driving a vehicle, and audible tasks may be undesirable if the user is in a meeting (as determined from the user's calendar for example).

In an embodiment, the device is configured such that the user is informed of the ambient data and user context-based authentication during initial device security setup. The user can then choose to set and train the alternative authentication mode data. For example, if the user prefers entry of a password for authentication, they may also be prompted to set and train the device for a spoken command authentication for use in situations where the user context precludes keypad use, such as when driving.

In general, when the user desires to unlock a device that is protected by an authentication mechanism and configured in accordance with the described principles, the device gathers the device's current device context factors and user context as it may affect the suitability of the currently set authentication mode. The device then uses this information to determine whether the current authentication mode is suitable or not. If the currently set authentication mode is suitable then the user executes the required authentication steps and unlocks the device using the current authentication mode.

Otherwise, the device evaluates other available authentication modes in light of the device context factors and user context and changes the authentication mode to an alternative authentication mechanism that is available on the device and that is suitable given the current device environment. Alternative authentication modes are chosen in an embodiment from a list of authentication types for which the user has set a value or trained the device as the case may be.

The change between authentication modes may be temporary or lasting. For example, in an embodiment, one authentication mode is considered preferred or primary, and the device returns to this mode shortly after each shift to an alternative mode. In an alternative embodiment, the device simply stays in whatever authentication mode was last utilized until reconfiguration or change in device environment or user context requires the use of another mode. For example, the device may be initially configured to use voice authentication but may be switched to password authentication in a noisy concert. The device may then remain in that mode until later, when it is switched back to use voice authentication once again as the user is driving.

Figure 2:
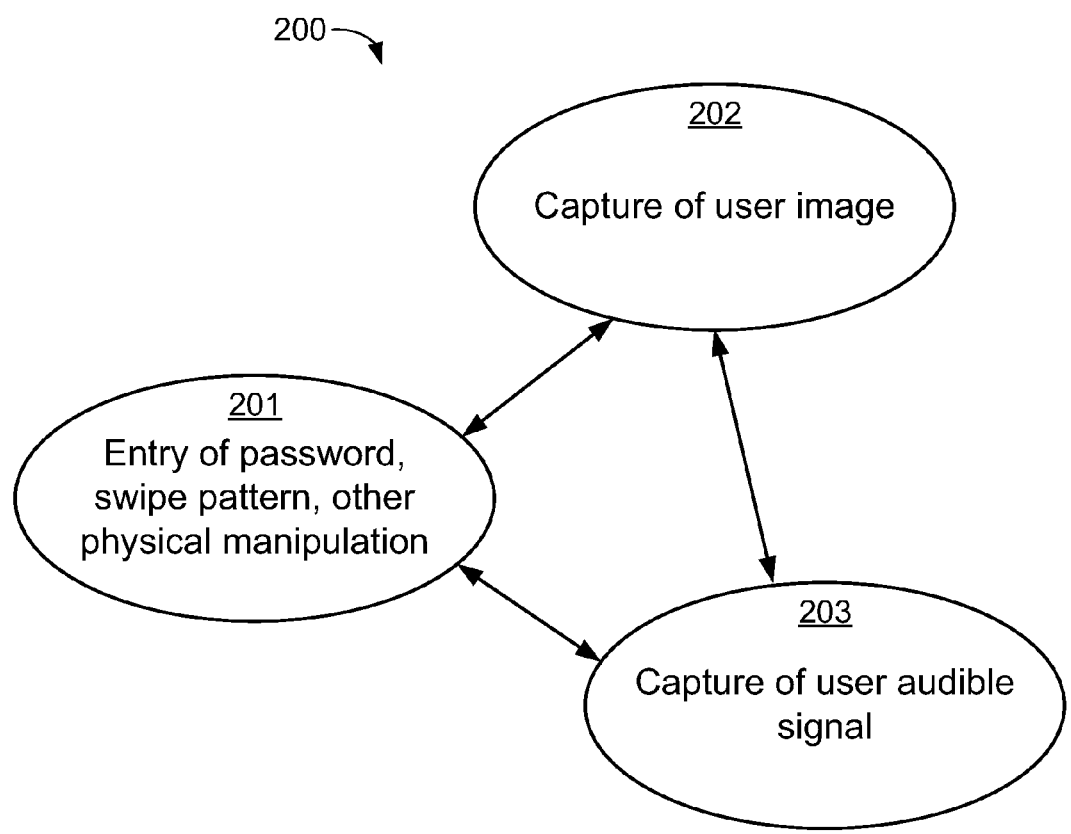
FIG. 2 is a state diagram showing device authentication mode states and state transitions in accordance with an embodiment of the disclosed principles.

The state of the device authentication configuration can be viewed via the state diagram 200 shown in FIG. 2. At any given time, the device is configured to require authentication via one of: performance by the user of a physical manipulation, corresponding to State A (201), capture of a user image, corresponding to State B (202), and capture of a user audible signal corresponding to State C (203). The starting state of the device may be preset or may be set by the user; state transitions thereafter will depend, in an embodiment, upon which authentication modes the user has enabled as well as the environments in which the device is used.

Figure 3:
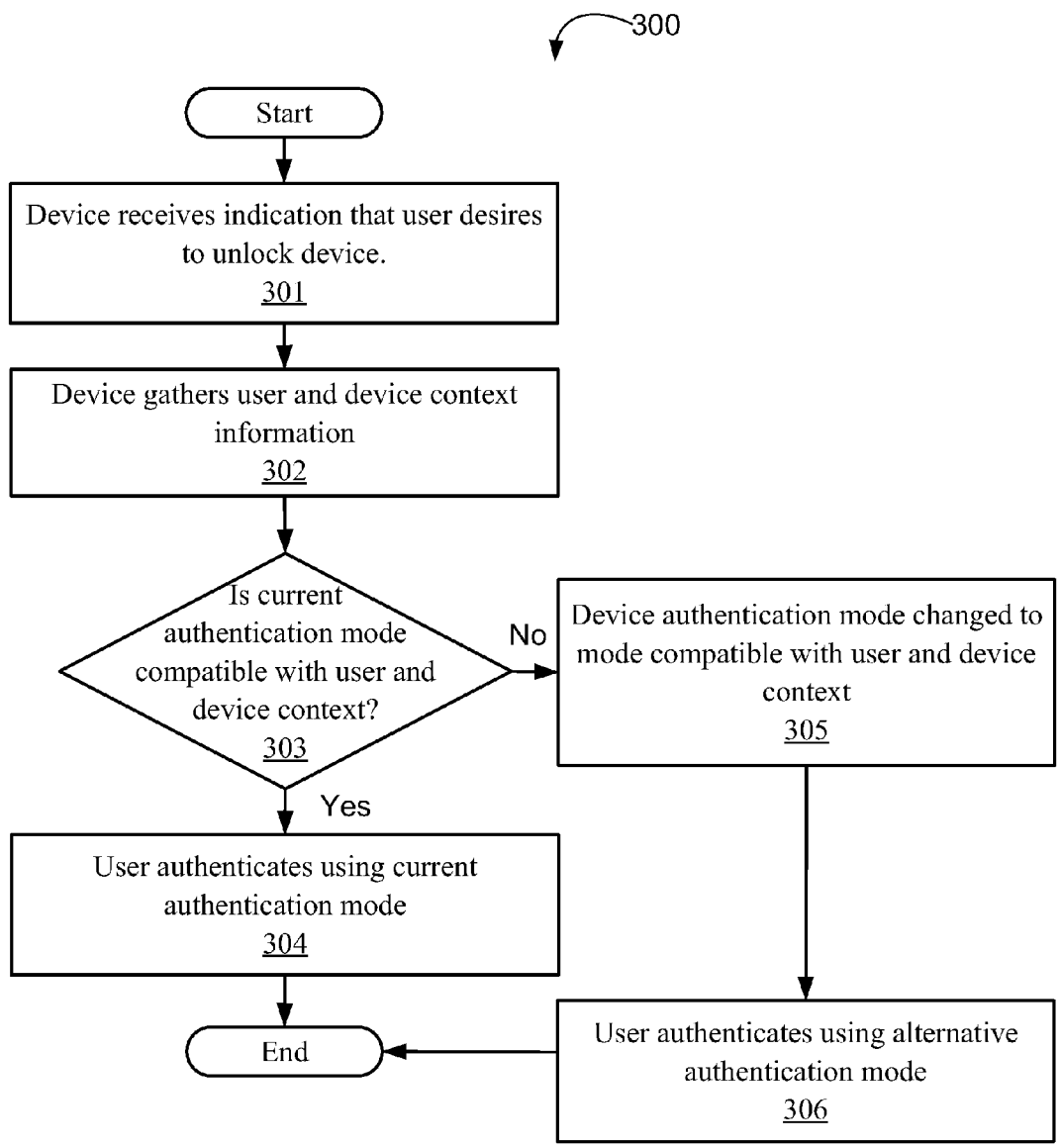
FIG. 3 is a flow chart showing a generalized process for authentication mode selection in accordance with embodiments of the disclosed principles.

The flowchart of FIG. 3 shows a process 300 of analyzing device context factors and user context and changing a device authentication mode from a current mode to an alternative mode if necessary. At stage 301 of the process 300, the device receives an indication from the user that the user desires to unlock the device. The device then gathers device context information and user context information at stage 302, including, for example, ambient light and noise information, as well as accelerometer, GPS or other information indicating that the user is driving or in a meeting. In an embodiment, the proximity of a vehicle Bluetooth connection associated with the user's vehicle is detected and used to infer driving.

At stage 303 of the process 300, the device determines whether the authentication mode of the device as currently configured is compatible with the gathered device context information and user context information. If it is determined at stage 303 that the authentication mode of the device as currently configured is compatible with the measured device context information and user context information, then the process 300 flows to stage 304, wherein user proceeds to authenticate using the current authentication mode.

Otherwise, the process 300 flows to stage 305 wherein the device authentication mode is changed to an alternative authentication mode that is compatible with the device context factors and user context. It will be appreciated that the device may reevaluate or reacquire device context information or user context information while evaluating alternative modes. Thereafter at stage 306, the user authenticates using the alternative authentication mode.

Figure 4:
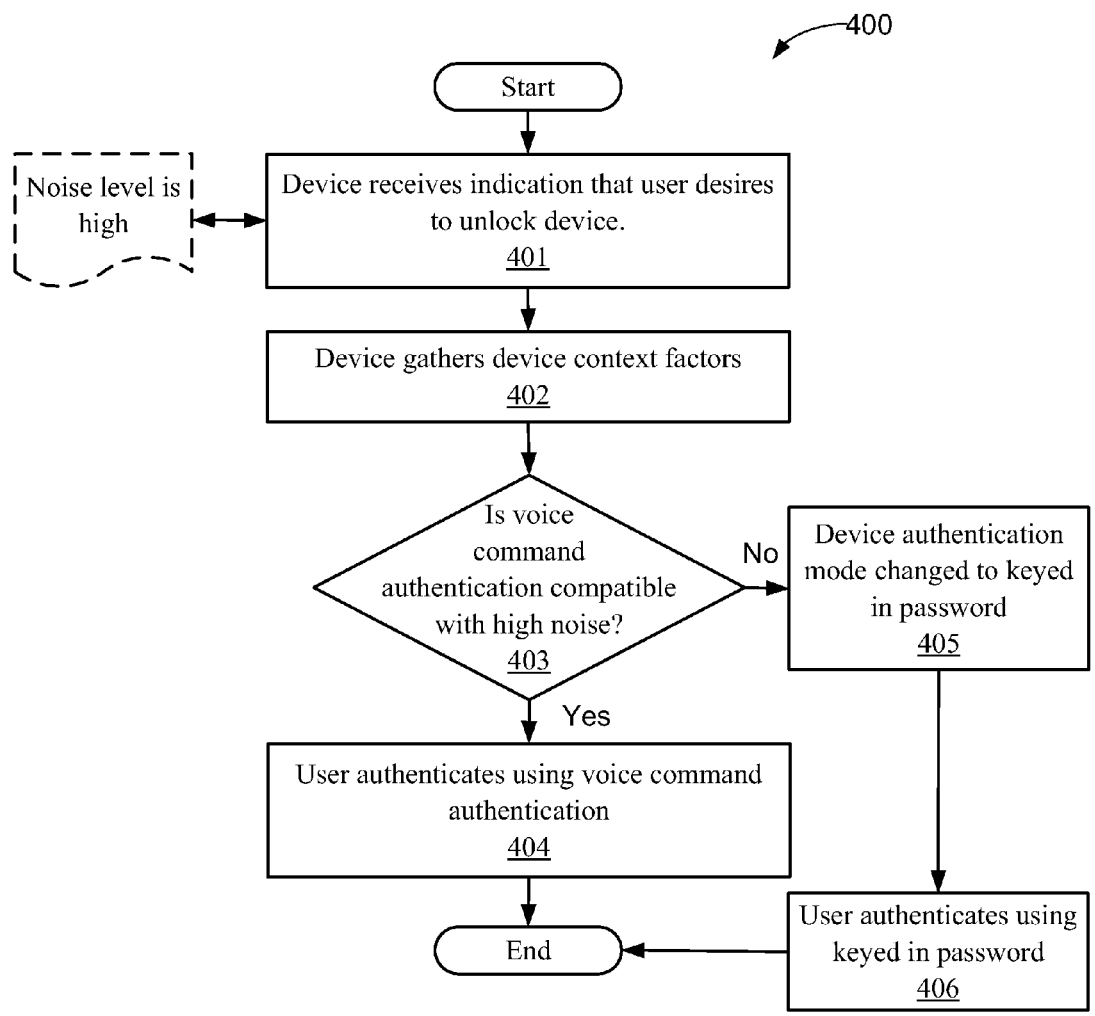
FIG. 4 is a flow chart showing a process for authentication mode selection in accordance with an example scenario in keeping with an embodiment of the disclosed principles.

While the flowchart of FIG. 3 shows a general process for matching the device authentication mode to the device and user context, FIG. 4 illustrates a process 400 undertaken in a specific example wherein a device is initially configured for voice recognition authentication and wherein alternative available modes include a spoken password and a keyed in password. The device context factors in the illustrated example is assumed to be a noisy mall, and the user context is that the user is walking through the mall.

At stage 401 of the process 400, the device receives an indication from the user that the user desires to unlock the device. The device then gathers device context information ("factors") and user context information at stage 402, including for example, ambient light and noise information, as well as accelerometer or other information which may be indicative of whether or not the user is driving. In an embodiment, the proximity of a vehicle Bluetooth connection is detected and used to infer that the user is or is not driving. In the illustrated example, the gathered device context information and user context information indicates a high level of ambient noise due to the noisy mall environment.

At stage 403 of the process 400, the device determines whether the voice command authentication mode of the device currently configured is compatible with the high level of ambient noise. If the high noise level is nonetheless not so high as to render voice command authentication unfeasible, then the process 400 continues to stage 404 and the user proceeds to authenticate using voice command authentication.

Otherwise, the device authentication mode is changed at stage 405 to an available alternative authentication mode that is compatible with the high-noise environment, i.e., in this case, the keyed in password authentication mode may be selected. Thereafter at stage 406, the user authenticates using the keyed in password.

In general, determining whether the current authentication mode is compatible with the current device context factors and user context as in stage 303 of process 300 may be accomplished in any suitable manner, and the decision as to compatibility may require reference to an implementation-specific threshold. For example, a given implementation may find a certain noise level to be too much for voice-based authentication while another implementation may accept this level of noise and only reject voice authentication at higher ambient noise levels.

Figure 5:
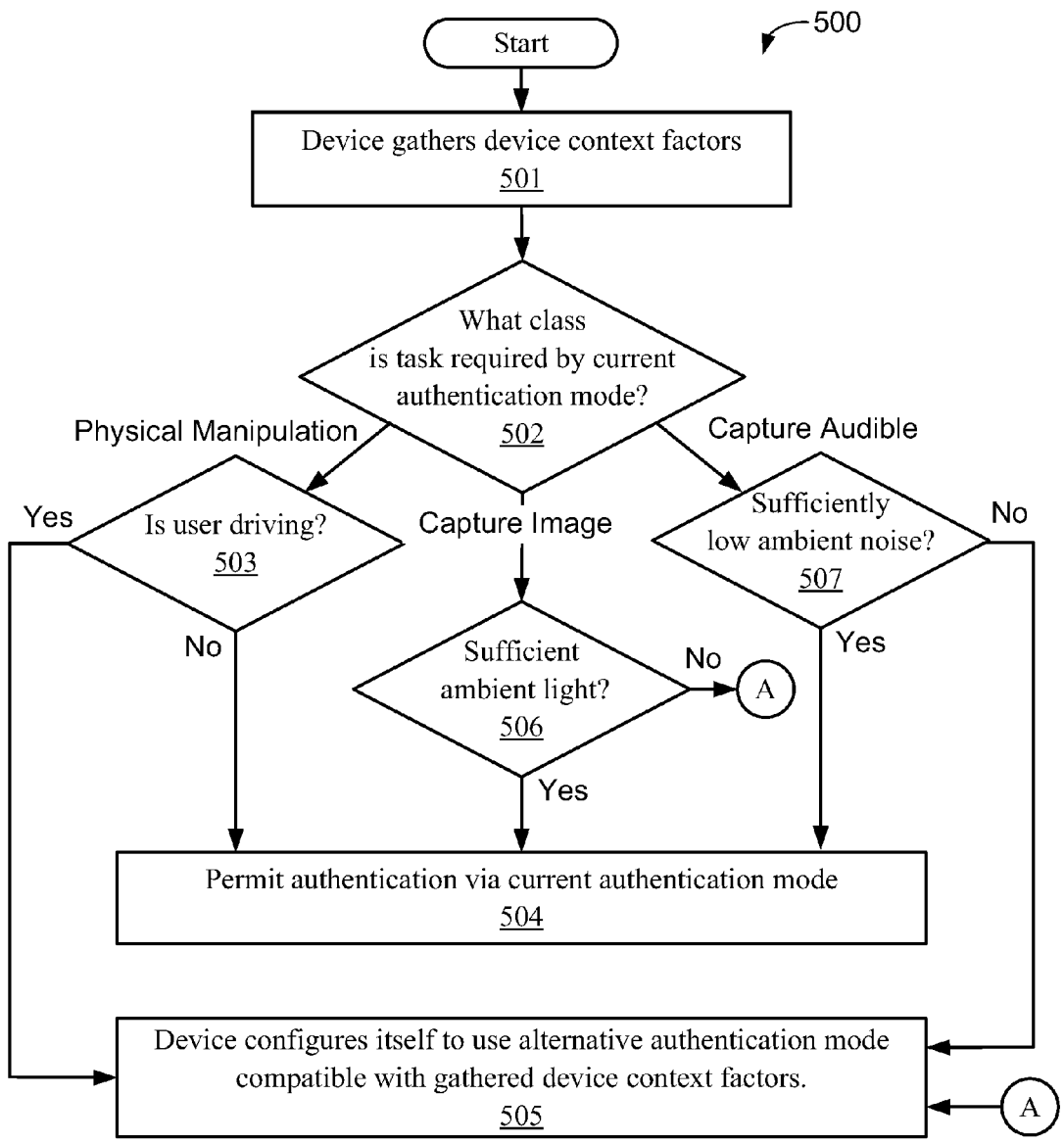
FIG. 5 is a flow chart showing a process for mode analysis in accordance with embodiments of the disclosed principles.

Whatever thresholds are selected in any given implementation, a general process for determining suitability of an authentication mode is shown in the process 500 of FIG. 5 by way of example. The process 500 begins at stage 501 by collecting device and user context information, e.g., ambient noise, light, movement, wireless signals, whether user is driving, whether user has a meeting scheduled, etc.

At stage 502 of the process 500, the device determines whether the task required by the authentication mode that the device is currently configured to use is a physical manipulation on the device by the user (see, for example, State A (201) of FIG. 2), the capture of a user image (see, for example, State B (202) of FIG. 2) or the capture of a user audible signal (see, for example, State C (203) of FIG. 2).

If the task required by the current authentication mode is a physical manipulation on the device by the user, then the process 500 flows to stage 503, wherein the device determines whether the user is driving a vehicle. This determination may involve, for example, detecting a vehicle area network associated with a user vehicle, detecting a speed of movement that is inconsistent with walking or running, or detecting a type of motion such as jostling and acceleration associated with driving.

If it is determined at stage 503 that the user is not driving a vehicle and that the user context does not otherwise weigh against the current mode, then the device permits authentication via the current authentication mode at stage 504. Otherwise, the process 500 flows to stage 505, wherein the device configures itself to use an alternative authentication mode that is not incompatible with the gathered device and user context information.

Returning to stage 502, if it is determined by the device that the task required by the current authentication mode is the capture of a user image, then the process 500 flows to stage 506, wherein the device determines whether the gathered device context factors indicate the presence of sufficient ambient light to allow a sufficiently accurate and detailed image to be captured for matching against the facial recognition samples. If it is determined at stage 506 that there is sufficient ambient light (and that the user context does not prevent the current authentication mode), then the device permits authentication via the current authentication mode at stage 504. Otherwise, the process 500 flows to stage 505, wherein the device configures itself to use an alternative authentication mode that is compatible with the gathered device and user context information.

If the task required by the current authentication mode is the capture of a user audible signal, then the process 500 flows to stage 507, wherein the device determines whether the gathered device context factors indicate a low enough level of ambient noise to allow an accurate user voice record to be captured (and whether the current user context would prevent an audible command, e.g., if the user has a meeting scheduled for the current time). If it is determined at stage 508 that there is a low enough level of ambient noise to allow capture of an accurate user voice record and that the user context does not otherwise preclude the use of a voice command, then the device permits authentication via the current authentication mode at stage 509. Otherwise, the process 500 flows to stage 505, wherein the device configures itself to use an alternative authentication mode that is compatible with the gathered device and user context information.

Figure 6:
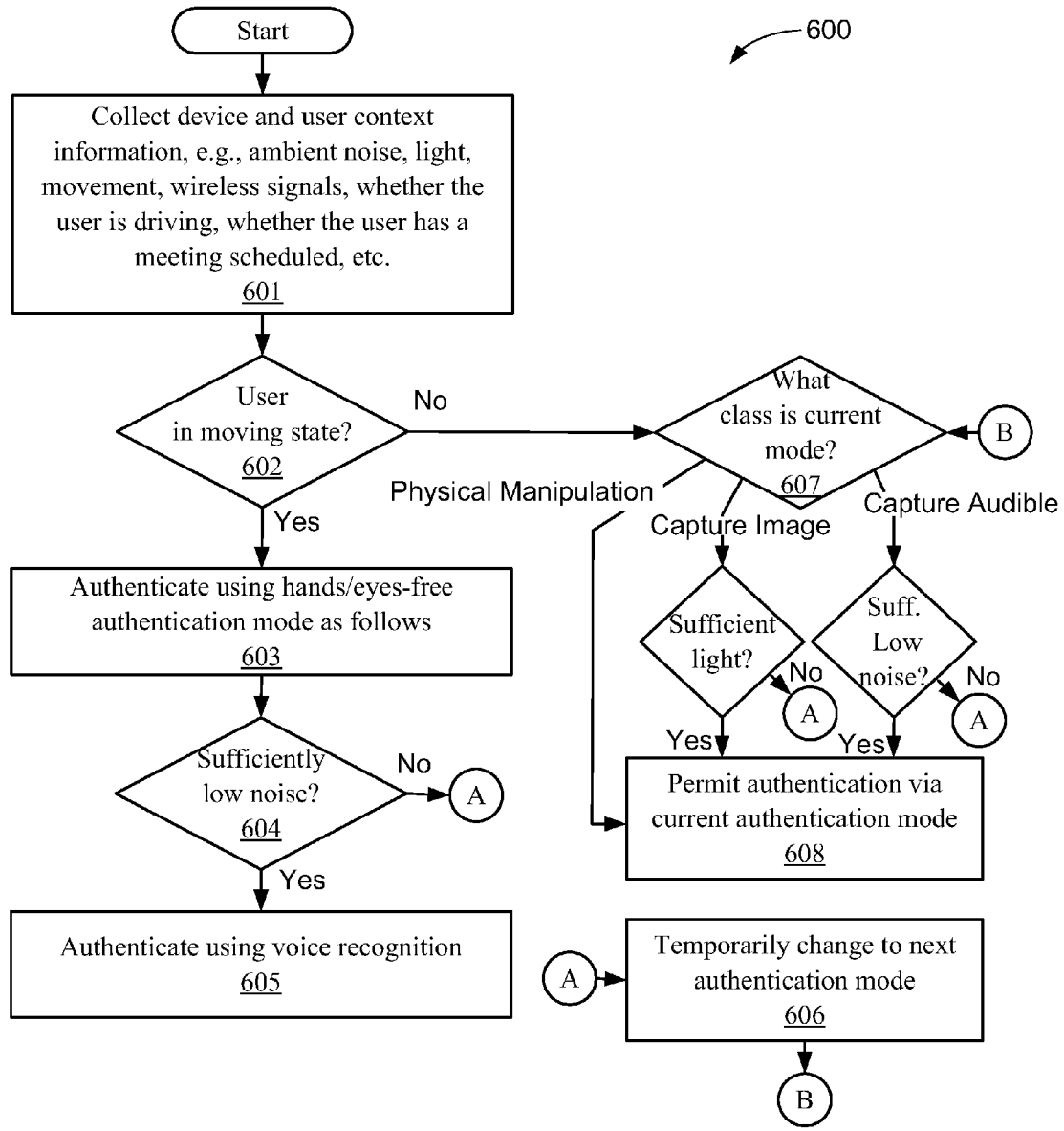
FIG. 6 is a flow chart showing a more generalized process for managing the authentication mode of a mobile communication device.

The flow chart of FIG. 6 illustrates a more generalized process 600 for managing the authentication mode of a mobile communication device. At stage 601 of the process 600, the device collects device and user context information, e.g., ambient noise, light, movement, wireless signals, whether the user is driving, whether the user has a meeting scheduled, etc. It is determined at stage 602 whether the user is driving, and if the user is driving, device authentication is set or allowed to remain in a hands-free and eyes-free authentication mode at stage 603.

Subsequently at stage 604, the device determines whether the device context information indicates the presence of sufficiently low ambient noise to allow voice recognition. If the device context information indicates the presence of sufficiently low ambient noise to allow voice recognition, the process 600 flows to stage 605 wherein the user authenticates using voice recognition. Otherwise, the device temporarily changes the current authentication mode to the next alternative mode at stage 606.

If at stage 602 it was determined that the user is not in a moving state, then the process 600 flows instead to stage 607, wherein the device determines whether the task required by the authentication mode that the device is currently configured to use is a physical manipulation on the device by the user (see, for example, State A (201) of FIG. 2), the capture of a user image (see, for example, State B (202) of FIG. 2) or the capture of a user audible signal (see, for example, State C (203) of FIG. 2). If the class of task required for the current authentication mode is physical manipulation or if the class is image capture or audio capture and there exists adequately bright light or low noise respectively, then the process 600 flows to stage 608. At stage 608, the device permits authentication via the current authentication mode.

If instead the task class of the current authentication mode is not physical manipulation and there exists insufficient light to allow accurate image capture and excessive noise to allow accurate audio capture, or low noise respectively, then the process 600 flows to stage 606. At this stage, the device temporarily changes the current authentication mode to the next alternative mode.

It will be appreciated that a system and process for allowing mobile electronic device authentication mode selection and switching has been disclosed. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A method of authenticating a user of a mobile communications device comprising:
    receiving an indication that the user desires to unlock the device;
    determining one or more device context factors regarding a current context of the device, the device context factors including ambient light;
    determining one or more user context factors, the user context factors including connectivity between the device and a vehicle area network associated with a vehicle of the user, wherein the determining of the user context factors comprises determining whether the user of the device is likely driving the vehicle;
    detecting a currently selected authentication mode of the device;
    evaluating whether the user is likely driving the vehicle, and whether the currently selected authentication mode requires a level of ambient light for one or more of facial recognition, typing by the user, or drawing by the user; and allowing the user to authenticate using the currently selected authentication mode when it is determined that the user is not likely driving the vehicle, and changing the authentication mode to another authentication mode that includes voice authentication when the user is likely driving the vehicle and when the currently selected authentication mode requires one or more of facial recognition, typing by the user, or drawing by the user, while the required level of ambient light is not met, wherein the mobile communications device comprises one of a mobile phone, a smartphone, a tablet computer, a laptop computer, a personal computer, or an embedded automobile computing system.

2. The method in accordance with claim 1 wherein determining whether the user of the device is likely driving a vehicle includes detecting motions at the device that are consistent with movement within a vehicle.

3. The method in accordance with claim 1 wherein determining whether the user of the device is likely driving a vehicle includes detecting a driving indicator.

4. The method in accordance with claim 1 wherein determining one or more device context factors includes determining an ambient noise level at the device.

5. The method in accordance with claim 4 further comprising determining whether the ambient noise level is too high to allow use of the currently selected authentication mode when the currently selected authentication mode requires user voice-based authentication.

6. A mobile communications device having adaptive authentication comprising:

one or more sensors or interfaces configured to detect one or more user context factors and one or more device context factors, the user context factors comprising connectivity between the device and a vehicle area network associated with a vehicle of a user;

one or more user input components through which user authentication can be accepted; and a processor configured to:

support a plurality of authentication modes, detect a current authentication mode of the device, evaluate whether the user is likely driving the vehicle and whether the current authentication mode requires an ambient light level and one or more of facial recognition, typing by the user, or drawing by the user;

allow the user to authenticate via the one or more user input elements using the current authentication mode when the current authentication mode is not likely driving the vehicle, and switch the authentication mode of the device to another authentication mode when the user is likely driving the vehicle and the current authentication mode requires one or more of facial recognition, typing by the user, or drawing by the user, and the required ambient light level is not met, wherein the another authentication mode includes voice authentication, wherein the mobile communications device comprises one of a mobile phone, a smartphone, a tablet computer, a laptop computer, a personal computer, or an embedded automobile computing system.

7. The mobile communications device in accordance with claim 6 wherein the context factors indicative of whether the user of the device is driving a vehicle include motions at the device that are consistent with movement within a vehicle.

8. The mobile communications device in accordance with claim 7 wherein context factors indicative of whether the user of the device is driving a vehicle include a driving indicator.

9. The mobile communications device in accordance with claim 6 wherein detecting the one or more device context factors includes detecting an ambient noise level at the device.

10. The mobile communications device in accordance with claim 9 wherein the processor is further configured to determine whether the ambient noise level is too high to allow use of the current authentication mode when the current authentication mode requires user voice-based authentication.

11. A method of configuring an authentication mode of a mobile communications device comprising:

detecting a current authentication mode of the mobile communications device, comparing user context and device context requirements of the current authentication mode to current user context and device context conditions at the mobile communications device, the user context conditions including connectivity between the device and a vehicle area network associated with a vehicle of a user, wherein the user context conditions comprise a likelihood that the user of the device is driving the vehicle and the device context conditions comprise an ambient light level; and switching from the current authentication mode to an alternative authentication mode when the user is likely driving the vehicle and the current authentication mode requires one or more of facial recognition, typing by the user, or drawing by the user, and a required ambient light level is not met, wherein the alternative authentication mode includes voice authentication, wherein the mobile communications device comprises one of a mobile phone, a smartphone, a tablet computer, a laptop computer, a personal computer, or an embedded automobile computing system.

\* \* \* \* \*